United States Patent
Doelle et al.

(12) 
(10) Patent No.: US 6,413,365 B1
(45) Date of Patent: Jul. 2, 2002

(54) METHOD OF LOADING A FIBER SUSPENSION WITH CALCIUM CARBONATE

(75) Inventors: Klaus Doelle; Oliver Heise, both of Menasha, WI (US)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 09/903,293

(22) Filed: Jul. 11, 2001

(51) Int. Cl.[7] .......................... D21H 17/10; D21H 17/64

(52) U.S. Cl. .................. 162/9; 162/181.2; 162/181.4; 162/158; 162/183

(58) Field of Search ................... 162/9, 158, 149, 162/181.2, 181.4, 100, 183; 423/430, 432

(56) References Cited

U.S. PATENT DOCUMENTS

| | | | |
|---|---|---|---|
| 4,892,590 A | * 1/1990 | Gill et al. ............. 106/217.01 |
| 5,096,539 A | * 3/1992 | Graham .................... 162/162 |
| 5,219,660 A | * 6/1993 | Wason et al. ............... 106/461 |
| 5,223,090 A | 6/1993 | Klungness et al. ............ 162/9 |
| 5,244,542 A | * 9/1993 | Bown et al. .............. 162/164.3 |
| 6,251,222 B1 | * 6/2001 | Silenius et al. ............. 162/100 |
| 6,251,356 B1 | * 6/2001 | Mathur ....................... 423/432 |

* cited by examiner

*Primary Examiner*—José A. Fortuna
(74) *Attorney, Agent, or Firm*—Taylor & Aust, P.C.

(57) ABSTRACT

A method of loading fibers in a fiber suspension with calcium carbonate includes the step of transporting a fiber suspension to an inlet of a housing. The fiber suspension includes calcium oxide and/or calcium hydroxide. The fiber suspension is distributed from the inlet using a rotatable distribution member. The fiber suspension is passed through a toothed ring interposed between the distribution member and a rotor and stator assembly. A reactant gas is supplied to a gas ring defined between a toothed ring and the rotor and stator assembly. Calcium carbonate crystals are formed in the fiber suspension as the fiber suspension passes through the gas ring. The calcium carbonate crystals are distributed in the fiber suspension using the rotor and stator assembly.

32 Claims, 2 Drawing Sheets

METHOD OF LOADING A FIBER SUSPENSION WITH CALCIUM CARBONATE

BACKGROUND OF THE INVENTION

1. Field of the Invention.

The present invention relates to an apparatus for loading fibers in a fiber suspension with a chemical compound, and, more particularly, to an apparatus for loading fibers in a fiber suspension with calcium carbonate.

2. Description of the Related Art.

A paper-making machine receives a fiber suspension including a plurality of fibers, such as wood fibers, which are suspended within an aqueous solution. The water is drained and the fiber suspension is dried in the paper-making machine to increase the fiber content and thereby produce a fiber web as an end product.

The fiber web produced by the paper-making machine typically includes organic wood fibers and inorganic fillers. A known inorganic filler is calcium carbonate, which may be added directly to the fiber suspension (direct loaded calcium carbonate). It is also known to chemically load the fibers within a fiber suspension with calcium carbonate in the lumen and walls of the individual fibers (fiber loaded calcium carbonate). The fiber loaded calcium carbonate increases the strength of the paper compared with a direct loaded calcium carbonate (adding calcium carbonate directly to the fiber suspension) at the same loading (filler) level. This yields an economic advantage in that the filler level of the paper is increased by replacing the more expensive fiber source (wood fibers) with calcium carbonate. The finished paper web has higher strength properties due to the increased filler levels of the calcium carbonate. In contrast, the strength properties of a finished web using direct loaded calcium carbonate is less.

For example, U.S. Pat. No. 5,223,090 (Klungness, et al.) discloses a method for chemically loading a fiber suspension with calcium carbonate. In one described method, calcium oxide or calcium hydroxide is placed within a refiner unit and carbon dioxide is injected into the refiner unit at a specified pressure. The fiber suspension is maintained within the refiner for a predetermined period of time to ensure that a proper chemical reaction and thus proper chemical loading of the fiber suspension occurs. In another described method, a fiber suspension with calcium oxide or calcium hydroxide is introduced into a 20 quart food mixer and carbon dioxide gas is injected into the mixer at a specified pressure. Using either the refiner or the food mixer, both methods utilize a batch processing method for processing only a small amount of the fiber suspension at a time. Because of the large amount of fiber suspension which is required at the wet end of a paper-making machine, a batch process requires that the chemically loaded fiber suspension be transferred to another holding tank for ultimate use in a paper-making machine.

What is needed in the a method for chemically loading a fiber suspension for use in a paper-making machine with an adequate output of a chemically loaded fiber suspension, of more than 2,200 cu. ft. up to 132,000 cu. ft. per day for today's paper making process, which allows commercialization of such a chemical loading process.

SUMMARY OF THE INVENTION

The present invention provides a method of loading fibers in a fiber suspension with calcium carbonate using an apparatus having a rotatable distribution member, a rotor and stator assembly, and a toothed ring positioned therein. A reactant gas, such as carbon dioxide, ozone and/or steam, is injected into a gas ring defined between the toothed ring and the rotor and stator assembly so that the chemical reaction forming calcium carbonate occurs.

The invention comprises, in one form thereof, a method of loading fibers in a fiber suspension with calcium carbonate. A fiber suspension is transported to an inlet of a housing. The fiber suspension includes calcium oxide and/or calcium hydroxide. The fiber suspension is distributed from the inlet using a rotatable distribution member. The fiber suspension is passed through a toothed ring interposed between the distribution member and a rotor and stator assembly. A reactant gas is supplied to a gas ring defined between a toothed ring and the rotor and stator assembly. Calcium carbonate crystals are formed in the fiber suspension as the fiber suspension passes through the gas ring. The calcium carbonate crystals are distributed in the fiber suspension using the rotor and stator assembly.

An advantage of the present invention is that the fiber loading of the fiber suspension takes place as a continuous process, thereby providing output quantities of loaded fiber suspension sufficient for use in a paper-making machine.

Another advantage is that the particular type of the calcium carbonate crystals which are formed may be controlled, dependant upon temperature, pH and reaction time within the toothed ring.

Yet another advantage is that the toothed ring controls the flow rate of the fiber suspension through the gas ring.

A still further advantage is that the consistency of the loaded fiber suspension may be varied at the accept outlet using dilution water.

A still further advantage is that loading of the fibers within the fiber suspension occurs in as well as on the fibers.

Another advantage is that the calcium carbonate crystals are generally evenly distributed within the fiber suspension using the rotor and stator assembly.

A still further advantage is that the distribution member as well as the rotor of the rotor and stator assembly are driven by a common input shaft.

Yet another advantage is that since the chemical reaction occurs within the gas ring, the loaded fiber suspension may be discharged to atmospheric pressure for further use or downstream processing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
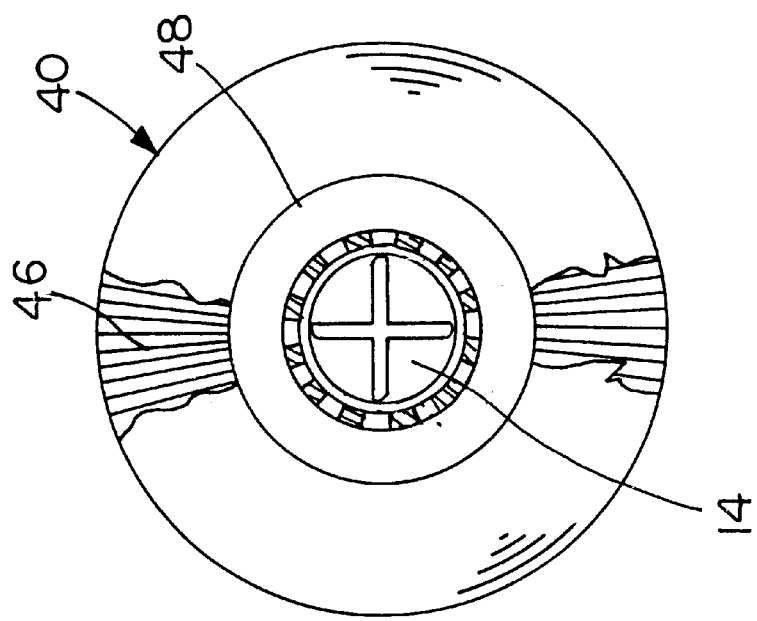
FIG. 2 is a sectional view of the fiber loading apparatus shown in FIG. 1, taken along line 2—2.
Figure 1:
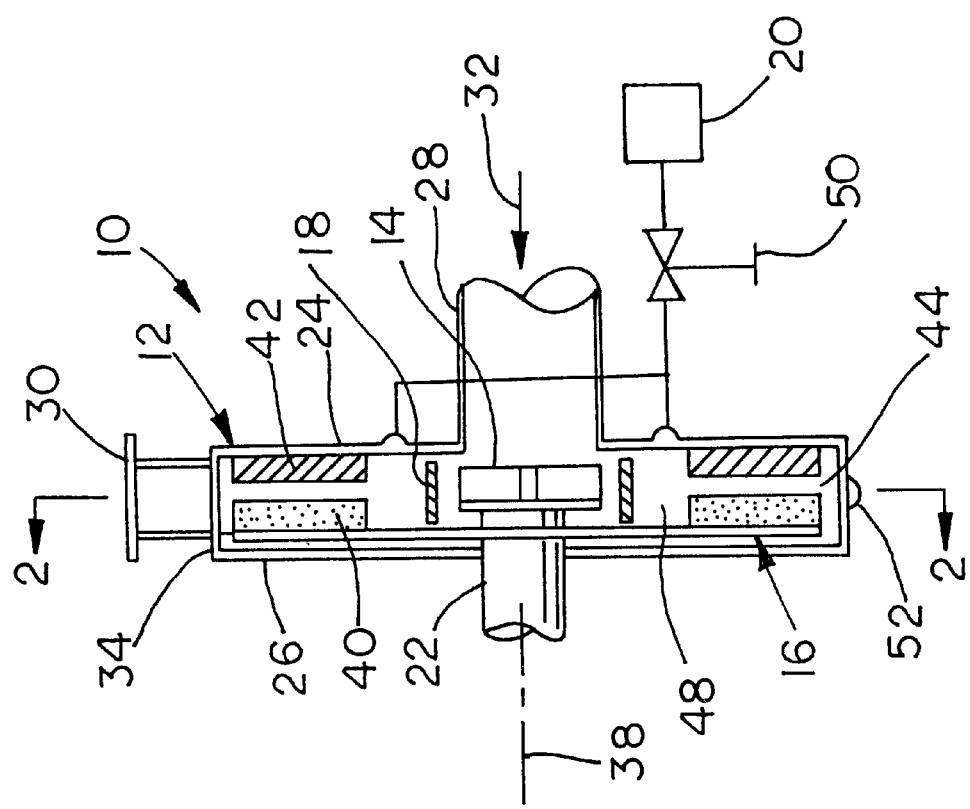
FIG. 1 is a sectional view of an embodiment of a fiber loading apparatus of the present invention.

Referring now to the drawings, and more particularly to FIGS. 1 and 2, there is shown an embodiment of a fiber loading apparatus 10 of the present invention for loading fibers in a fiber suspension with calcium carbonate. Fiber loading apparatus 10 generally includes a housing 12, rotatable distribution member 14, rotor and stator assembly 16, toothed ring 18, reactant gas supply 20 and input shaft 22.

Housing 12 includes two annular shaped walls 24 and 26, an inlet 28 and an accept outlet 30. Inlet 28 is in the form of an inlet pipe which receives a pulp and lime mixture, as indicated by arrow 32. The lime may be in the form of calcium hydroxide and/or calcium oxide, as will be described in more detail hereinafter. Inlet pipe 28 is coupled with an opening formed in annular wall 24 to provide the pulp and lime mixture to the interior of housing 12. Accept outlet 30 is coupled with and extends from peripheral wall 34 extending between annular walls 24 and 26.

Figure 3:
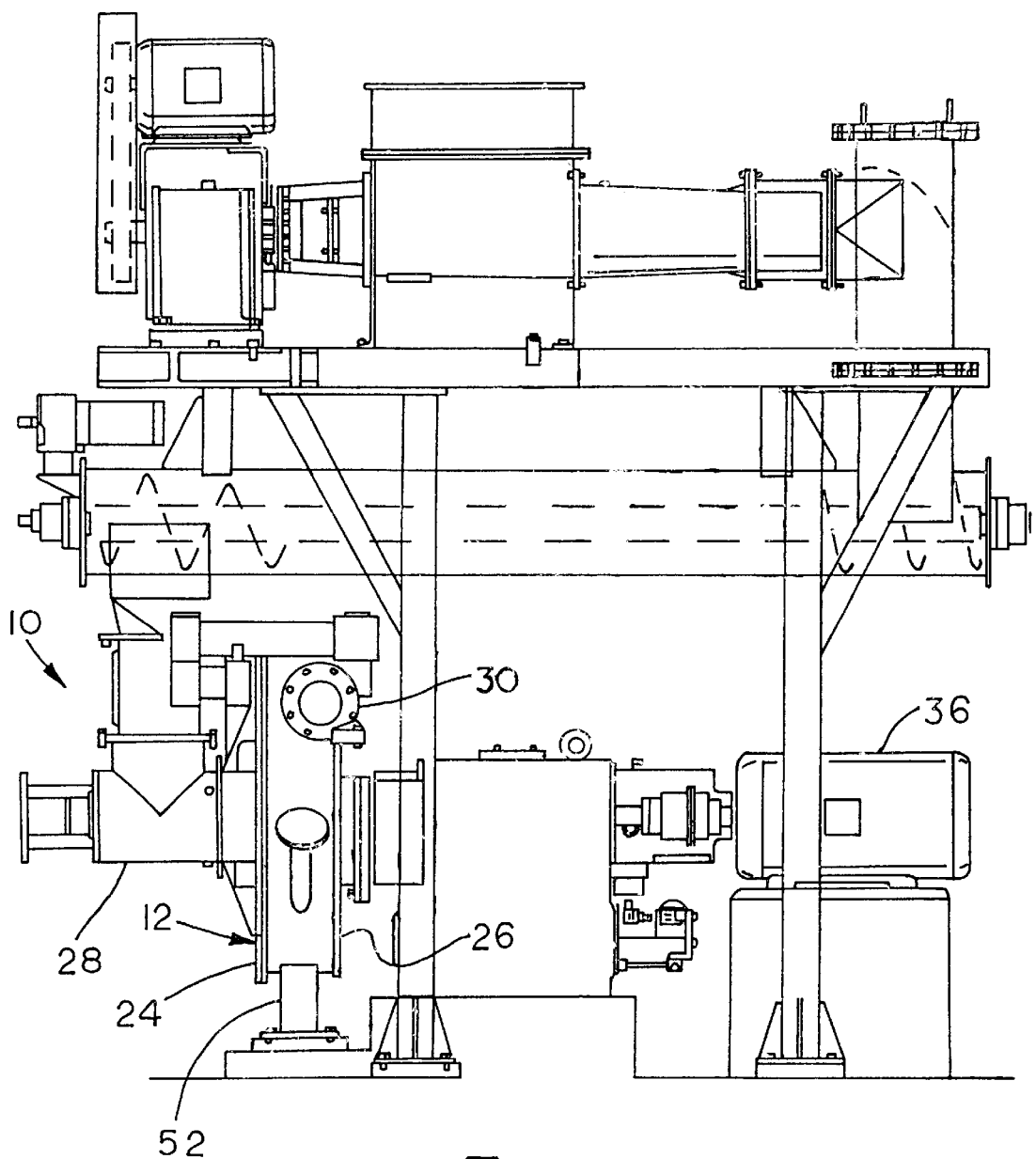
FIG. 3 is a side view of the fiber loading apparatus shown in FIGS. 1 and 2, incorporated within a fiber loading system.

Rotatable distribution member 14 is in the form of a distribution cross in the embodiment shown, having a plurality (namely four) radially extending paddles which distribute the pulp and lime mixture received from inlet pipe 28 in a radially outward direction. Distribution cross 14 is concentrically coupled with input shaft 22, which in turn is rotatably driven via an electric motor 36 (FIG. 3). Distribution cross 14 and input shaft 22 thus each have a common axis of rotation 38. Distribution cross 15 is also positioned generally concentric with inlet pipe 28 so as to evenly distribute the pulp and lime mixture in a radially outward direction within housing 12.

Rotor and stator assembly 16 includes a rotor 40 and a stator 42. Stator 42 is attached to and carried by annular wall 24. Rotor 40 is positioned in opposed relationship relative to stator 42 to define a gap 44 therebetween. The distance of gap 44 between rotor 40 and stator 42 is between approximately 0.5 and 100 mm, preferably between approximately 25 and 75 mm. Each of rotor 40 and stator 42 have an outside diameter of between 0.5 and 2 meters, resulting in a tangential velocity at the outside diameter of rotor 40 of between 20 and 100 meters per second, preferably between 40 and 60 meters per second, at the rotational speed of input shaft 22. Rotor 40 and stator 42 each include a plurality of teeth, in known manner. The gap distance between rotor 40 and stator 42, as well as the particular configuration of the teeth design of rotor 40 and stator 42, may vary, depending upon the particular application.

Rotor 40 and input shaft 22 are coupled together via disk 50. Rotor 40 is coupled with disk 50 such that rotor 40 is generally concentric about axis of rotation 38.

Toothed ring 18 is attached to annular wall 24 and extends towards annular wall 26 in a direction generally parallel to axis of rotation 38. Toothed ring 18 is interposed between distribution member 14 and rotor and stator assembly 16. Toothed ring 18 includes a plurality of teeth 46 (shown in cross section in FIG. 2) which are annularly spaced relative to each other. Teeth 46 may have a generally rectangular cross-sectional shape as shown or may be differently shaped, depending upon the particular application. The size of teeth 46, as well as the spacing between teeth 46, is selected to control the rate of flow of the fiber suspension in a radially outward direction from distribution member 14, depending upon operating conditions such as pressure, etc.

Toothed ring 18 and rotor and stator assembly 16 define a gas ring 48 therebetween. Gas ring 48 is annular shaped and extends between toothed ring 18 and rotor and stator assembly 16. The size of gas ring 48, defined primarily in terms of the radial expanse of gas ring 48, is pertinent to the reaction time of the chemical reaction which occurs within gas ring 48, as will be described hereinafter.

Reactant gas supply 20 is fluidly coupled with gas ring 48 at a plurality of locations. Gas supply 20 supplies a reactant gas, such as carbon dioxide, ozone and/or steam to gas ring 48. A control valve 50 is coupled with reactant gas supply 20 and controls a pressure and/or flow rate of the reactant gas which flows into gas ring 48. In the embodiment shown, reactant gas supply is in the form of a carbon dioxide gas supply.

Dilution water inlet 52 is coupled with peripheral wall 34. Dilution water inlet 52 is coupled with a source of dilution water and is used to dilute the fiber suspension to a desired consistency prior to discharge from accept outlet 30.

During use, a fiber suspension in the form of a pulp and lime mixture is transported through inlet pipe 28 to the interior of housing 12. The fiber suspension has a fiber consistency of between approximately 2.5% and 60% at inlet pipe 28, and preferably has a consistency of between approximately 15% and 35% at inlet pipe 28. The lime may include calcium hydroxide and/or calcium oxide, and preferably includes calcium hydroxide at a concentration of between 0.1% and 60% dry weight before being mixed with the fiber suspension, more preferably has a concentration of between 2% and 20% dry weight before being mixed with the fiber suspension.

Distribution cross 15 distributes the fiber suspension in a radially outward direction toward toothed ring 18. Toothed ring regulates the flow of the fiber suspension into gas ring 48.

A reactant gas, such as carbon dioxide, ozone and/or steam, preferably carbon dioxide, is injected into gas ring 48 from reactant gas supply 20. The carbon dioxide is injected into gas ring 48 at a temperature between approximately −15° C. and 120° C., preferably at a temperature between approximately 20° C. and 90° C. Moreover, the carbon dioxide is injected into gas ring 48 at a pressure of between approximately 0.1 and 6 bar, preferably between approximately 0.5 and 3 bar. The fiber suspension has a pH within gas ring 48 of between approximately 6.0 and 10 pH, preferably between approximately 7.0 and 8.5 pH. The temperature and pressure of the carbon dioxide gas, the pH of the fiber suspension, and reaction time within gas ring 48, primarily determine the type of calcium carbonate crystals which are formed as a result of a chemical reaction between the carbon dioxide and the lime in the fiber suspension. The calcium carbonate crystals have a rombohedral, scalenohedral or sphere shape, depending upon these operating conditions. The calcium carbonate crystals are loaded into the lumen as well as on the walls of the individual fibers within the fiber suspension. The formed calcium carbonate crystals have a size distribution of between approximately 0.05 and 5 micrometers, preferably of between 0.3 and 2.5 micrometers.

The loaded fiber suspension then flows from gas ring 48 through rotor and stator assembly 16. More particularly, the fiber suspension flows through gap 44, as well as the spaces between adjacent teeth of rotor 40 and stator 42. Rotor and stator assembly 16 distributes the calcium carbonate crystals in the fiber suspension. The fiber suspension has a pulp consistency of between approximately 0.1% and 50% when passing through rotor and stator assembly 16, and preferably has a pulp consistency of between approximately 2.5% and 35%. The fiber suspension, loaded with calcium carbonate crystals on and in individual fibers within the fiber suspension, is discharged through accept outlet 30 to atmospheric pressure for further processing, such as to a machine or chest.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of loading fibers in a fiber suspension with calcium carbonate, comprising the steps of:
   providing a housing having an inlet and an accept outlet;
   providing a rotatable distribution member within said housing;
   providing a rotor and stator assembly within said housing radially outside of said distribution member;
   transporting a fiber suspension to said inlet, said fiber suspension including at least one of calcium oxide and calcium hydroxide;
   distributing said fiber suspension from said inlet using said rotatable distribution member;
   passing said fiber suspension through a toothed ring interposed between said distribution member and said rotor and stator assembly;
   supplying a reactant gas to a gas ring defined between said toothed ring and said rotor and stator assembly;
   passing said fiber suspension through said gas ring;
   forming calcium carbonate crystals in said fiber suspension within said gas ring; and
   distributing said calcium carbonate crystals in said fiber suspension using said rotor and stator assembly.

2. The method of claim 1, said step of supplying a reactant gas comprising supplying at least one of carbon dioxide and ozone.

3. The method of claim 1, said transporting step comprising transporting a fiber suspension at a consistency of between approximately 2.5 and 60% to said inlet.

4. The method of claim 3, said transporting step comprising transporting a fiber suspension at a consistency of between approximately 15 and 35% to said inlet.

5. The method of claim 1, wherein said fiber suspension transported to said inlet includes calcium hydroxide at a concentration of between 0.1 and 60% dry weight before being mixed with said fiber suspension.

6. The method of claim 5, wherein said fiber suspension transported to said inlet includes calcium hydroxide at a concentration of between 2 and 20% dry weight before being mixed with said fiber suspension.

7. The method of claim 1, said toothed ring regulating a flow of said fiber suspension into said gas ring.

8. The method of claim 1, wherein said supplying step comprises supplying said reactant gas to said gas ring at a temperature between approximately −15° C. and 120° C.

9. The method of claim 8, wherein said supplying step comprises supplying said reactant gas to said gas ring at a temperature between approximately 20° and 90° C.

10. The method of claim 8, wherein said forming step comprises forming calcium carbonate crystals having a crystal type of one of rombohedral, scalenohedral and sphere shaped, dependent upon said temperature.

11. The method of claim 1, wherein said supplying step comprises supplying said reactant gas to said gas ring at a pressure between approximately 0.1 and 6 bar.

12. The method of claim 11, wherein said supplying step comprises supplying said reactant gas to said gas ring at a pressure between approximately 0.5 and 3 bar.

13. The method of claim 1, wherein said step of forming said calcium carbonate crystals includes the sub-step of loading said calcium carbonate crystals at least one of in and on fibers in said fiber suspension.

14. The method of claim 1, wherein said calcium carbonate crystals have a size distribution of between approximately 0.05 and 5 micrometer.

15. The method of claim 14, wherein said calcium carbonate crystals have a size distribution of between approximately 0.3 and 2.5 micrometer.

16. The method of claim 1, wherein said fiber suspension passing through said rotor and stator assembly has a pulp consistency of between approximately 0.1 and 50%.

17. The method of claim 1, wherein said fiber suspension passing through said rotor and stator assembly has a pulp consistency of between approximately 5 and 35%.

18. The method of claim 1, wherein said fiber suspension has a pH in said gas ring of between approximately 6.0 and 10.0 pH.

19. The method of claim 1, wherein said fiber suspension has a pH in said gas ring of between approximately 7.0 and 8.5 pH.

20. The method of claim 1, wherein said rotor and stator have a gap distance therebetween of between approximately 0.5 and 100 millimeters.

21. The method of claim 20, wherein said rotor and stator have a gap distance therebetween of between approximately 25 and 75 millimeters.

22. The method of claim 1, wherein said rotor and stator have a diameter of between approximately 0.5 and 2 meters.

23. The method of claim 22, wherein said rotor has a tangential velocity of between 20 and 100 meters per second.

24. The method of claim 23, wherein said rotor has a tangential velocity of between 40 and 60 meters per second.

25. The method of claim 1, wherein said forming step comprises reacting said fiber suspension and said reactant gas in said gas ring for a period of time between approximately 0.001 and 60 seconds.

26. The method of claim 25, wherein said forming step comprises reacting said fiber suspension and said reactant gas in said gas ring for a period of time between approximately 0.01 and 0.05 seconds.

27. The method of claim 1, wherein total energy for said process is between approximately 0.3 and 8 kWh/ton.

28. The method of claim 27, wherein total energy for said process is between approximately 0.5 and 4 kWh/ton.

29. The method of claim 1, wherein said process results in a fiber suspension with said calcium carbonate loaded at between approximately 0.1 and 16% consistency.

30. The method of claim 29, wherein said process results in a fiber suspension with said calcium carbonate loaded at between approximately 2 and 6%consistency.

31. The method of claim 1, including the further step of discharging said loaded fiber suspension to atmospheric pressure.

32. A method of loading fibers in a fiber suspension with calcium carbonate, comprising the steps of:
   providing a housing having an inlet and an accept outlet;
   providing a rotatable distribution member within said housing;
   providing a rotor and stator assembly within said housing radially outside of said distribution member;
   transporting a fiber suspension to said inlet, said fiber suspension having a pH of between approximately 6.0 and 10.0 pH, and including at least one of calcium oxide and calcium hydroxide;

distributing said fiber suspension from said inlet using said rotatable distribution member;

passing said fiber suspension through a toothed ring interposed between said distribution member and said rotor and stator assembly;

supplying a reactant gas to a gas ring defined between said toothed ring and said rotor and stator assembly at a temperature between approximately −15 C and 120 C;

passing said fiber suspension through said gas ring;

forming calcium carbonate crystals by reacting said fiber suspension and said reactant gas in said gas ring for a period of time between approximately 0.01 and 1 minute; and distributing said calcium carbonate crystals in said fiber suspension using said rotor and stator assembly.

* * * * *